United States Patent
Cho et al.

(10) Patent No.: US 10,931,446 B2
(45) Date of Patent: Feb. 23, 2021

(54) METHOD AND SYSTEM FOR PROTECTING SHARING INFORMATION

(71) Applicant: WAEM CO., LTD., Seoul (KR)

(72) Inventors: Rae Sung Cho, Seoul (KR); Dong Hyun Cho, Seoul (KR)

(73) Assignee: WAEM CO., LTD., Seoul (KR)

( * ) Notice: Subject to any disclaimer, the term of this patent is extended or adjusted under 35 U.S.C. 154(b) by 92 days.

(21) Appl. No.: 16/074,418

(22) PCT Filed: Jan. 9, 2017

(86) PCT No.: PCT/KR2017/000261
§ 371 (c)(1),
(2) Date: Jul. 31, 2018

(87) PCT Pub. No.: WO2017/213321
PCT Pub. Date: Dec. 14, 2017

(65) Prior Publication Data
US 2019/0036685 A1    Jan. 31, 2019

(30) Foreign Application Priority Data

Jun. 8, 2016    (KR) .................. 10-2016-0071212

(51) Int. Cl.
*H04L 29/06*        (2006.01)
*H04L 9/08*         (2006.01)
(Continued)

(52) U.S. Cl.
CPC .............. *H04L 9/085* (2013.01); *G06F 11/16* (2013.01); *G06F 21/6218* (2013.01);
(Continued)

(58) Field of Classification Search
None
See application file for complete search history.

(56) References Cited

U.S. PATENT DOCUMENTS 8,051,205 B2 * 11/2011 Roy .................. G06F 16/1834
709/244
8,081,758 B2 * 12/2011 Takata .................. H04L 9/0891
380/255
(Continued)

FOREIGN PATENT DOCUMENTS

JP        4456185 A      2/2010
JP     2015-179890 A    10/2015
(Continued)

OTHER PUBLICATIONS

International Search Report dated Apr. 14, 2017, issued in corresponding International Application No. PCT/KR2017/000261, filed Jan. 9, 2017, 5 pages.

*Primary Examiner* — Maung T Lwin
(74) *Attorney, Agent, or Firm* — Christensen O'Connor Johnson Kindness PLLC

(57) ABSTRACT

Disclosed herein are a method and system for protecting shared information. The information protection method includes setting shared information to be protected and a sharing counterpart with whom the shared information is to be shared, segmenting the shared information into a plurality of pieces and storing the segmented pieces in the terminals of respective users included in the sharing counterpart, and receiving the segmented pieces from the terminals of the users and restoring the shared information if all of the users included in the sharing counterpart accept the use of the shared information.

10 Claims, 6 Drawing Sheets

(51) Int. Cl.
  *G06F 11/16*   (2006.01)
  *G06F 21/62*   (2013.01)
  *H04L 29/08*   (2006.01)
  *H04L 9/14*    (2006.01)

(52) U.S. Cl.
  CPC ............ *H04L 9/0894* (2013.01); *H04L 9/14* (2013.01); *H04L 63/0428* (2013.01); *H04L 67/1097* (2013.01); *H04L 69/14* (2013.01); *G06F 2221/2149* (2013.01)

(56) References Cited

U.S. PATENT DOCUMENTS

| | | | | |
|---|---|---|---|---|
| 8,464,066 | B1* | 6/2013 | Price | H04L 63/10 |
| | | | | 709/217 |
| 9,361,450 | B2* | 6/2016 | Hirose | G06F 21/36 |
| 2002/0194295 | A1* | 12/2002 | Mercure | H04L 63/08 |
| | | | | 709/217 |
| 2010/0185852 | A1* | 7/2010 | Ogawa | G06F 21/602 |
| | | | | 713/165 |
| 2014/0173270 | A1* | 6/2014 | Matsuo | H04L 9/0869 |
| | | | | 713/150 |
| 2014/0259134 | A1* | 9/2014 | Scavo | H04L 63/0815 |
| | | | | 726/7 |

FOREIGN PATENT DOCUMENTS

| | | |
|---|---|---|
| KR | 10-2013-0008147 A | 1/2013 |
| KR | 10-2009-0129741 A | 10/2014 |
| KR | 10-2016-0022230 A | 2/2016 |

\* cited by examiner

METHOD AND SYSTEM FOR PROTECTING SHARING INFORMATION

CROSS REFERENCE TO RELATED APPLICATION

The present application claims the benefit of Korean Patent Application No. 10-2016-0071212 filed in the Korean Intellectual Property Office on Jun. 8, 2016, the entire contents of which are incorporated herein by reference.

BACKGROUND OF THE INVENTION

1. Technical Field

The following description relates to a technology for safely protecting shared information, such as a photo, an image or a document.

2. Description of the Related Art

Today a photo or a moving image can be easily photographed using various photographing devices, such as a camera and a smartphone. Anyone can check the contents of an image photographed as described above. Due to such a problem, extremely personal contents or the contents of an image that requires security are commonly protected using an cipher method.

As an example of the cipher method, Korean Patent Application Publication No. 10-2005-0000238 (Jan. 3, 2005) entitled "Photograph device for mobile communication device" discloses a technology in which a unique number (e.g., ESN, MIN or IMSI) assigned to a device is automatically watermarked on an image when the image is captured.

However, information protected by a cipher is easily deciphered if a corresponding ciphered image data and cipher leak.

In particular, a case where a person who keeps an image including personal contents between lovers maliciously opens the image to the public frequently, such as the leakage of a revenge image that is now problematic, occurs.

Accordingly, there is a need for a method, which can prevent a person who keeps an image of another person or an image including important contents from opening or distributing a corresponding image regardless of another's intention.

SUMMARY OF THE INVENTION

Embodiments of the present invention provide a method and system capable of preventing the leakage of unwanted information by preventing information including contents to be protected from being used without permission from a counterpart who shares the information including contents to be protected.

There is provided an information protection method implemented by a computer, including setting shared information to be protected and a sharing counterpart with whom the shared information is to be shared, segmenting the shared information into a plurality of pieces and storing the segmented pieces in the terminals of respective users included in the sharing counterpart, and receiving the segmented pieces from the terminals of the users and restoring the shared information if all of the users included in the sharing counterpart accept the use of the shared information.

In an aspect, storing the segmented pieces may include segmenting the shared information into pieces of a number corresponding to the number of persons of the sharing counterpart.

In another aspect, storing the segmented pieces may include ciphering the segmented pieces and transmitting the ciphered segmented pieces to the terminals of the respective users.

In yet another aspect, storing the segmented pieces may include ciphering the segmented pieces using different encryption keys and transmitting the ciphered segmented pieces to the terminals of the respective user.

In yet another aspect, storing the segmented pieces may include transmitting an encryption key used for the ciphering of the segmented pieces to the terminals of the respective users along with the segmented pieces.

In yet another aspect, an encryption key used for the ciphering of the segmented pieces may be stored in a repository different from the repository of the segmented pieces.

In yet another aspect, restoring the shared information may include requesting use acceptance for the shared information from the terminal of another user included in the sharing counterpart when a use request for the shared information is received from the terminal of any one user included in the sharing counterpart, receiving all of the segmented pieces forming the shared information from the terminals of all users included in the sharing counterpart when all the users accept the use of the shared information and restoring the shared information, and transmitting the restored shared information to the terminal of the user who has requested the use of the shared information.

In yet another aspect, restoring the shared information may include receiving an encryption key from the terminal of each user along with the segmented piece, deciphering the segmented piece, and restoring the shared information.

In yet another aspect, restoring the shared information may include processing the restored shared information using a copy prevention scheme so that the duplication of the restored shared information is impossible.

There is provided an information protection system implemented as a computer, including an information segmentation unit configured to set shared information to be protected and a sharing counterpart with whom the shared information is to be shared, segment the shared information into a plurality of pieces, and store the segmented pieces in the terminals of respective users included in the sharing counterpart and an information restoration unit configured to receive the segmented pieces from the terminals of the users and restore the shared information if all of the users included in the sharing counterpart accept the use of the shared information.

DETAILED DESCRIPTION

Hereinafter, embodiments of the present invention are described in detail with reference to the accompanying drawings.

Embodiments of the present invention relate to a technology for safely protecting information, such as documents, photos, moving images and voice shared between users.

In this specification, shared information means all of pieces of information capable of being shared between two or more users. Representative examples of the shared information may include various documents or voice in addition to photos and moving images, that is, photographed information.

Figure 1:
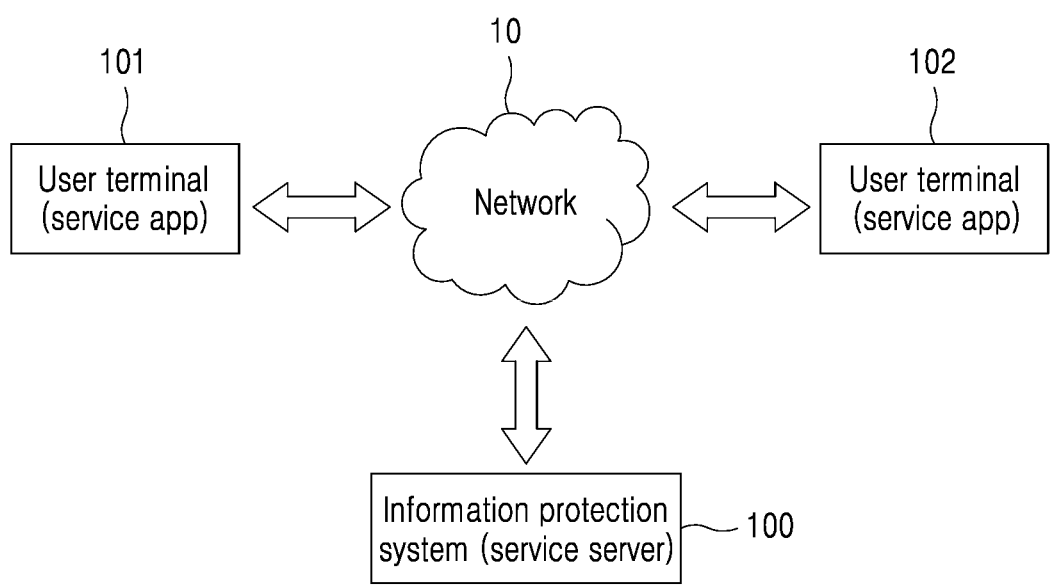
FIG. 1 is a diagram for illustrating an example of an information protection environment in an embodiment of the present invention.

FIG. 1 is a diagram for illustrating an example of an information protection environment in an embodiment of the present invention. FIG. 1 shows user terminals 101 and 102 and an information protection system 100. In FIG. 1, an arrow means that data may be transmitted/received between the elements over a wired/wireless network 10.

The user terminal 101, 102 may execute one or more processes configured to perform one or more of characteristics described in this specification. The user terminal 101, 102 may mean all of terminal devices capable of accessing a web/mobile site related to the information protection system 100 or installing and executing a service-dedicated app related to the information protection system 100. In this case, the user terminal 101, 102 may perform general service operations, such as a service screen configuration, data input, data transmission/reception, and data storage, under the control of the web/mobile site or dedicated app.

An example of the user terminal 101, 102 may include a smartphone, a tablet, a wearable computer, a personal computer (PC), a notebook computer and laptop computer, but is not limited thereto.

The user terminal 101, 102 may be connected to the network 10 (e.g., the Internet or a local area network) directly or indirectly. For example, a PC and a notebook computer may be directly connected to the network 10 through a wired network connection. A laptop computer may be wirelessly connected to the network 10 through a wireless communication channel established between a laptop computer and a wireless access point (WAP). A smartphone may be wirelessly connected to the network 10 through a wireless communication channel established between a smartphone and a cellular network/bridge. In this case, the network 10 may communicate with one or more secondary networks (not shown). Examples of the secondary networks may include a local area network, a wide area network and an intranet, but are not limited thereto.

The user terminal 101, 102 may interface with the information protection system 100 over the network 10.

The information protection system 100 may execute one or more processes configured to perform one or more of the characteristics described in this specification. The information protection system 100 may be implemented on a service platform that provides information protection service including the characteristics described in this specification, and may provide an environment in which shared information between the user terminals 101 and 102, that is, clients using the information protection service, is protected to the user terminals 101 and 102.

The information protection system 100 corresponds to a server computer. An example of the server computer may include a server computing device, a PC, a server computer, a series of server computers, a mini computer and/or a mainframe computer, but is not limited thereto. The server computer may be a distributed system. Furthermore, the operations of the server computer may be executed on one or more processors simultaneously and/or sequentially.

The information protection system 100 may be implemented in an app form in which at least some element are installed on the user terminal 101, 102 or may be implemented in a form included in a platform that provides services in a client-server environment.

Figure 2:
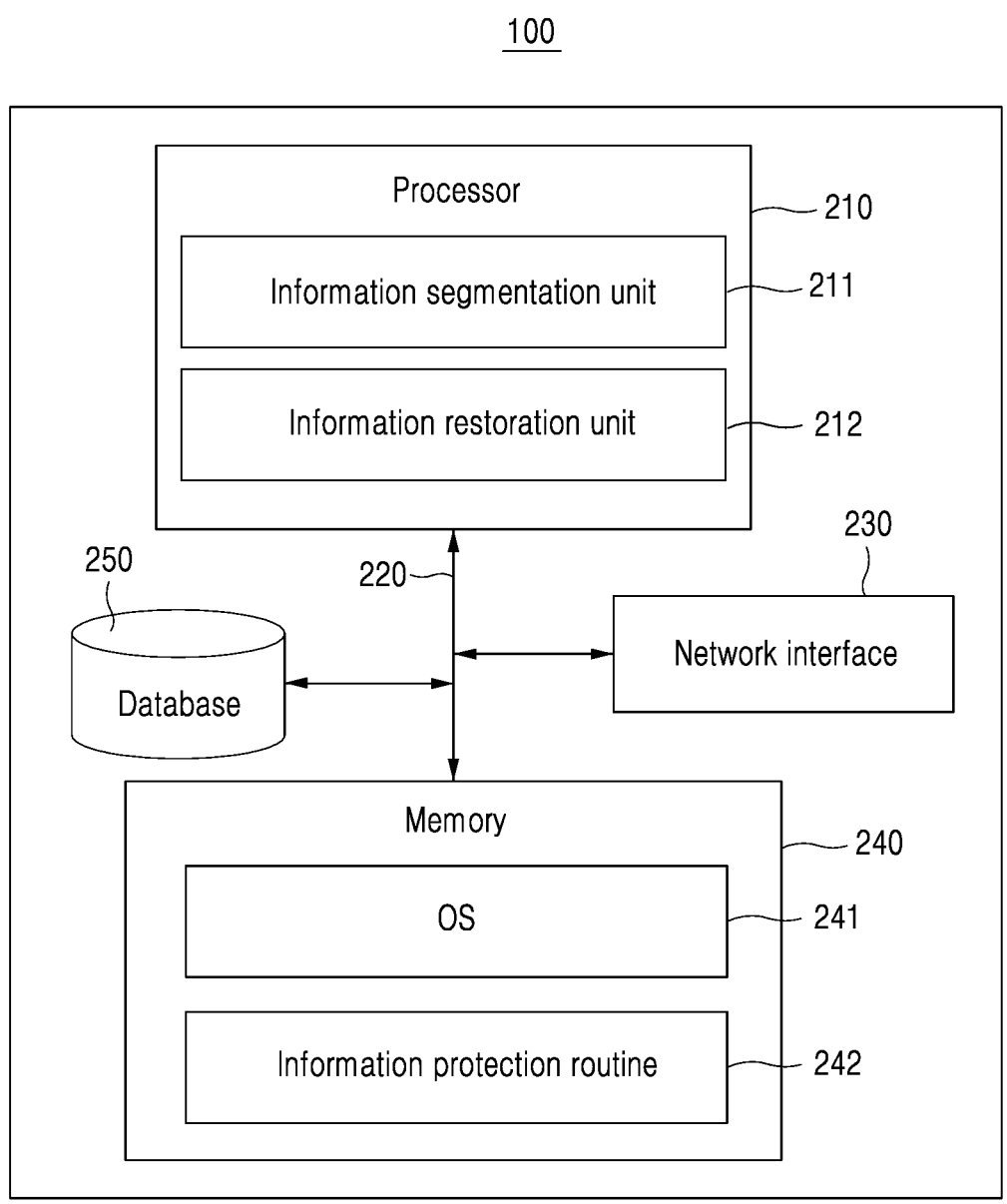
FIG. 2 is a block diagram for illustrating the internal configuration of the information protection system in an embodiment of the present invention.
Figure 3:
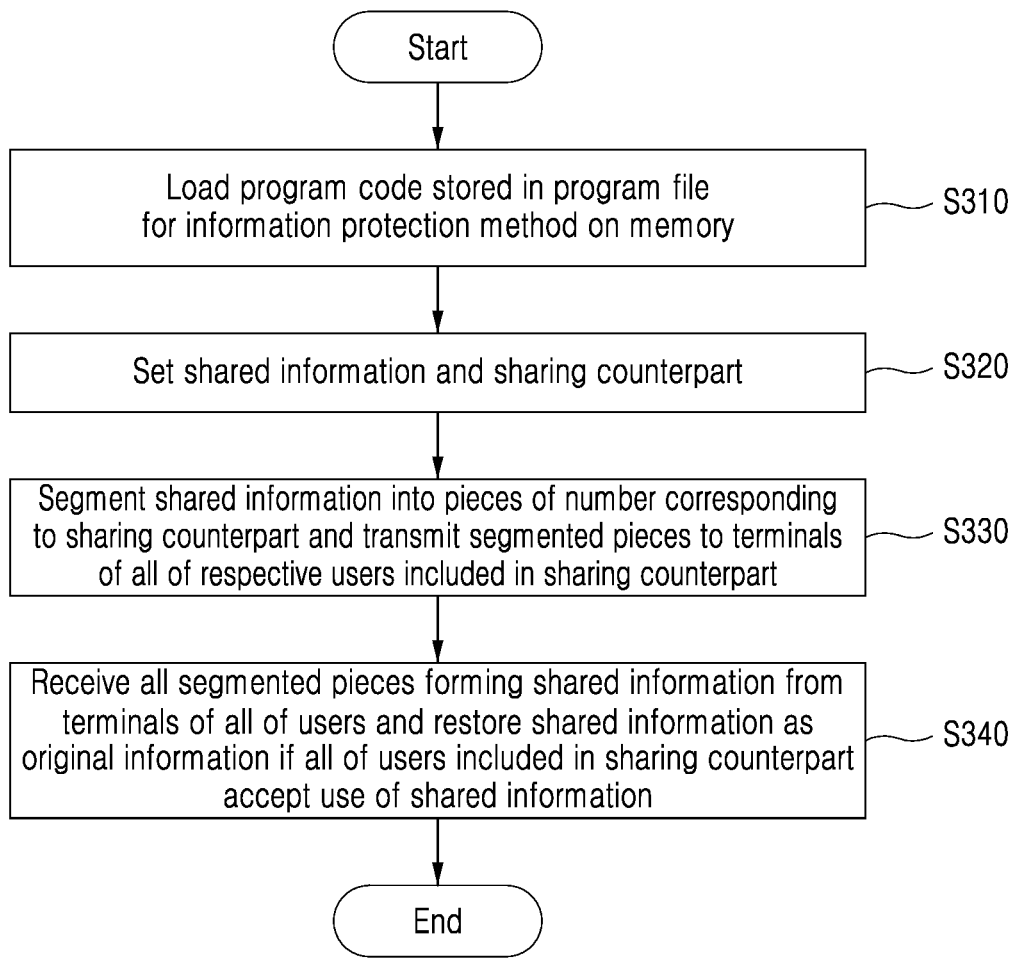
FIG. 3 is a flowchart showing an information protection method in an embodiment of the present invention.

FIG. 2 is a block diagram for illustrating the internal configuration of the information protection system in an embodiment of the present invention. FIG. 3 is a flowchart showing an information protection method in an embodiment of the present invention.

The information protection system 100 according to the present embodiment may include a processor 210, a bus 220, a network interface 230, memory 240 and a database 250. The memory 240 may include an operating system (OS) 241 and an information protection routine 242. The processor 210 may include an information segmentation unit 211 and an information restoration unit 212. In other embodiments, the information protection system 100 may include more elements than the elements of FIG. 2. However, most of conventional elements do not need to be clearly shown. For example, the information protection system 100 may include other element, such as a display or a transceiver.

The memory 240 is a computer-readable recording medium, and may include permanent mass storage devices, such as random access memory (RAM), read only memory (ROM) and a disk drive. Furthermore, the memory 240 may store the OS 241 and program code for the information protection routine 242. Such software elements may be loaded from a computer-readable recording medium separate from the memory 240 using a drive mechanism (not shown). Such a separate computer-readable recording medium may include computer-readable recording media (not shown), such as a floppy drive, a disk, a tape, a DVD/CD-ROM drive and a memory card. In other embodiments, the software elements may be loaded onto the memory 240 through the network interface 230 not a computer-readable recording medium.

The bus 220 may enable communication and data transmission between the elements of the information protection system 100. The bus 220 may be configured using a high-speed serial bus, a parallel bus, a storage area network (SAN) and/or other proper communication technology.

The network interface 230 may be a computer hardware element for connecting the information protection system 100 to a computer network. The network interface 230 may connect the information protection system 100 to the computer network through a wired or wireless connection.

The database 250 may function to store and retain information necessary to provide the information protection service and all of pieces of information shared through the corresponding service. For example, the database 250 may store and retain personal information (e.g., login information and friend information) of a user who uses the information protection service, information shared with other persons, etc. In FIG. 2, the database 250 has been illustrated as being constructed within the information protection system 100, but the present invention is not limited thereto. The database may be omitted depending on a system implementation method or an environment or some of or the entire database may be present as an external database constructed on a separate system. Alternatively, the database 250 may be implemented as a local database included in an app installed on the user terminal 101, 102.

The processor 210 may be configured to process the instructions of a computer program by performing basic arithmetic and logic and the input/output operations of the information protection system 100. The instructions may be provided from the memory 240 or the network interface 230 to the processor 210 through the bus 220.

As shown in FIG. 2, the processor 210 may include the information segmentation unit 211 and the information restoration unit 212. The elements of the processor 210 may be expressions of different functions performed by the processor 210 in response to a control command provided as at least one program code. For example, the information segmentation unit 211 may be used as a functional expression operating to control the information protection system 100 so that the processor 210 splits shared information. The processor 210 and the elements of the processor 210 may perform steps S310 to S340 included in an information protection method of FIG. 3. For example, the processor 210 and the elements of the processor 210 may be implemented to execute the code of the OS 241 of the memory 240 and instructions according to the at least one program code. In this case, the at least one program code may correspond to the code of a program implemented to process the information protection method.

The information protection method may not be performed in order shown, and some of the steps may be omitted from the information protection method or an additional process may be further included in the information protection method.

In step S310, the processor 210 may load program code stored in a program file for the information protection method on the memory 240. For example, the program file for the information protection method may have been stored in a permanent storage device. The processor 210 may control the information protection system 100 so that the program code is loaded from the program file stored in the permanent storage device to the memory 240 through the bus 220. In this case, the processor 210 and the information segmentation unit 211 and information restoration unit 212 of the processor 210 may be different functional expressions of the processor 210 for executing instructions that belong to the program code loaded on the memory 240 and that include corresponding portions and then executing steps S320 to S340. In order to execute steps S320 to S340, the processor 210 and the elements of the processor 210 may directly perform operation according to a control command or may control the information protection system 100.

In step S320, the information segmentation unit 211 may set information to be shared (hereinafter referred to as "shared information") and a target who will share the shared information (hereinafter referred to as a "sharing counterpart") so that information including contents to be protected is shared between users. For example, the information segmentation unit 211 may photograph a photo or a moving image and set corresponding photographed information as shared information. For another example, the information segmentation unit 211 may generate a voice file through recording and set a generated file as shared information. For yet another example, if a stored file, for example, a file photo, a moving image, document or voice is called through call, the information segmentation unit 211 may set the called file as shared information. In other words, the information segmentation unit 211 may directly set a file generated through a function, such as photographing, recording or document writing, as shared information while operating in conjunction with the corresponding function or may call various files stored in a local storage space and/or an external storage space and set the called files as shared information. A file set as the shared information is not stored in a user terminal. If a file stored in a user terminal is set as shared information, the file may be automatically deleted from the user terminal after it is delivered to the server. Furthermore, the information segmentation unit 211 may provide a counterpart list in which a relation (e.g., fried) with a user who has requested information sharing has been set, and may set a target selected through a corresponding list as a sharing counterpart. For example, the information segmentation unit 211 may provide a list of users who can use the information protection service (e.g., a list of users who have installed a dedicated app) while operating in conjunction with contact information or messenger friend list of a user terminal.

In step S330, the information segmentation unit 211 may segment the shared information into pieces of a number corresponding to the sharing counterpart, and may transmit the segmented pieces of the shared information to the terminals of all of respective users included in the sharing counterpart. For example, the information segmentation unit 211 may segment the shared information into pieces of a number corresponding to the number of persons of the sharing counterpart. In other words, if N is set as the sharing counterpart for the shared information, the information segmentation unit 211 may segment the shared information into N pieces. For example, if a user A attempts to share a photo photographed along with a user B with the user B, the information segmentation unit 211 may segment the photo into two pieces. For example, in the segmentation method, the information segmentation unit 211 may segment the actual data (or file) itself of the shared information into the N pieces, and may segment the shared information into the N pieces based on a layer unit, a time interval unit, a space range unit or a library unit by taking the type of shared information into consideration. A method of segmenting the shared information is not limited to the above embodiment, and may be implemented in various manners in which the original information cannot be restored based on only some pieces. In this case, the shared information may be divided at the same ratio and segmented or may be segmented at different ratios between users. For example, if a user A and a user B attempt to share one photo, the corresponding photo may be segmented into two pieces, each one having the same ratio of 50%, or may be segmented into two pieces at different ratios, such as 70% and 30%. The processor 210 may retain information related to the segmentation of the shared information, that is, information about the sharing counterpart and the segmented pieces, as information necessary to restore the shared information after the segmentation process by matching the related information with the corresponding shared information. Accordingly, the information segmentation unit 211 segments the shared information into multiple pieces and stores the multiple pieces into multiple user terminals in a piece unit. Accordingly, an information protection level can be improved because shared information cannot be used without permission from a counterpart. Furthermore, the information segmentation unit 211 may cipher the segmented pieces of the shared information and transmit the ciphered segmented pieces to a user terminal. A encryption key used in this case may be the same or different with respect to the segmented pieces, thereby being capable of improving an information protection level. The information segmentation unit 211 may transmit the encryption key used for the ciphering of the segmented pieces to the user terminal so that the encryption key is stored along with the corresponding piece. For another example, the information segmentation unit 211 may not transmit the encryption key used for the ciphering of the segmented pieces to the user terminal, but may store it in the server. In this case, an information protection level can be improved because the encryption key used for the ciphering of the segmented pieces and the segmented piece are stored in different repositories.

In step S340, if all of users included in the sharing counterpart accept the use of the shared information, the information restoration unit 212 may receive all the segmented pieces forming the shared information from the terminals of the users and restore the shared information as the original information. For example, when a use request for the shared information is received from the terminal of any one of the users included in the sharing counterpart, the information restoration unit 212 may request the segmented pieces of the shared information from the terminals of other users, and may receive segmented pieces from the terminal of the user who has requested the use of the shared information and the terminals of the users who have accepted the use of the shared information. Furthermore, if all the segmented pieces of the shared information are received, the information restoration unit 212 may restore the shared information as the original information by synthesizing the received segmented pieces and transmit the restored shared information to the terminal of the user who has requested the use of the shared information. The restoration and use of shared information is impossible without permission from a counterpart who shares the shared information, that is, if some of segmented pieces forming the shared information is not received. If the segmented pieces of the shared information have been ciphered, for example, the information restoration unit 212 may also request an encryption key in the process of requesting the segmented piece of the shared information from the terminal of the user, may receive the encryption key along with the segmented pieces from the terminal of the user, and may restore the segmented pieces. For another example, if an encryption key has been stored in the server, the information restoration unit 212 may read the encryption key used for the ciphering of the segmented pieces, may decipher the segmented pieces, and may restore the shared information. Furthermore, when restored shared information is transmitted to the terminal of the user who has requested the use of the shared information, the information restoration unit 212 may process the restored shared information using a copy prevention scheme (e.g., watermark technology) so that duplication, such as the copy of the restored shared information, is impossible. Accordingly, the information restoration unit 212 can process shared information including contents to be protected between users so that the restoration and use of the shared information are possible only when there is an agreement between the users.

A detailed embodiment is described below using photographed information as a representative example of shared information.

Figure 4:
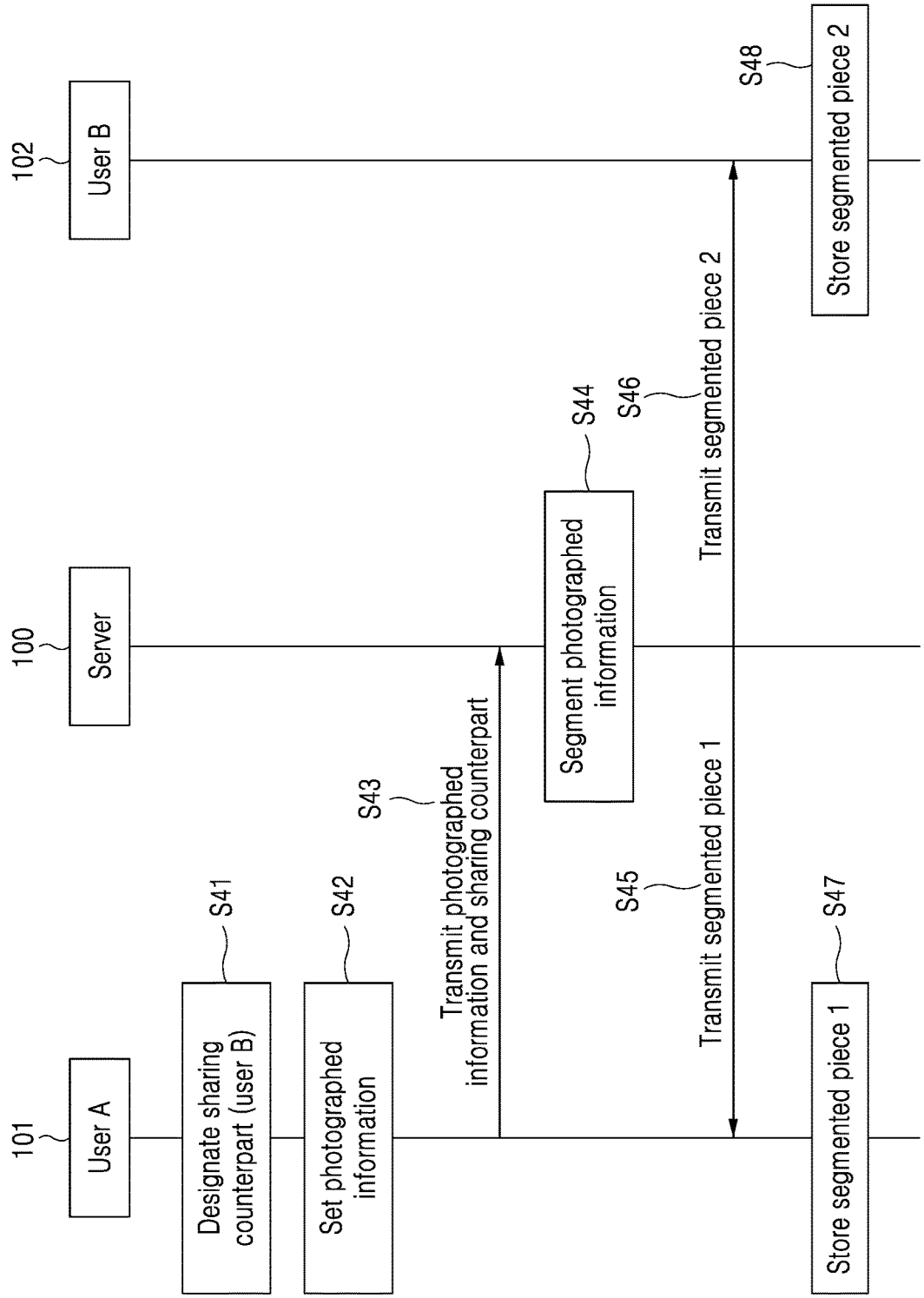
FIG. 4 is a diagram for illustrating an example of a photographed information segmentation process according to an embodiment of the present invention.

FIG. 4 is a diagram for illustrating an example of a photographed information segmentation process according to an embodiment of the present invention.

Referring to FIG. 4, the user A 101 may set the user B 102 as a counterpart with whom information is to be shared (S41), and may set photographed information through the photographing of a photo or a moving image (S42).

When the setting of the sharing counterpart and the photographed information is completed, the terminal of the user A 101 may transmit the photographed information to the server 100 along with information about the sharing counterpart (S43). In this case, the photographed information to be shared with the user B 102 is deleted from the terminal of the user A 101 without being stored therein.

When the information about the sharing counterpart and the photographed information are received from the terminal of the user A 101, the server 100 may segment the photographed information into pieces of a number corresponding to the number of persons of the sharing counterpart (S44). For example, the server 100 may segment the photographed information to be shared between the user A 101 and the user B 102 into two pieces (e.g., segmented piece 1 and segmented piece 2), each one having the same ratio of 50%. In this case, the photographed information is segmented in a form in which it cannot be restored as the original photographed information using the segmented pieces themselves.

Furthermore, the server 100 may transmit the segmented piece 1 of the segmented pieces forming the photographed information to the terminal of the user A 101 (S45), and may transmit the segmented piece 2 to the terminal of the user B 102 (S46).

The terminal of the user A 101 receives the segmented piece 1 of the segmented pieces of the photographed information from the server 100 and stores the received segmented piece 1 (S47). The terminal of the user B 102 receives the segmented piece 2 of the segmented pieces of the photographed information from the server 100 and stores the received segmented piece (S48).

Accordingly, the photographed information including contents to be protected by the user A 101 and the user B 102 is segmented, retained and shared in a piece unit so that it cannot be restored as the original information without being stored in any terminal in a complete form.

Figure 5:
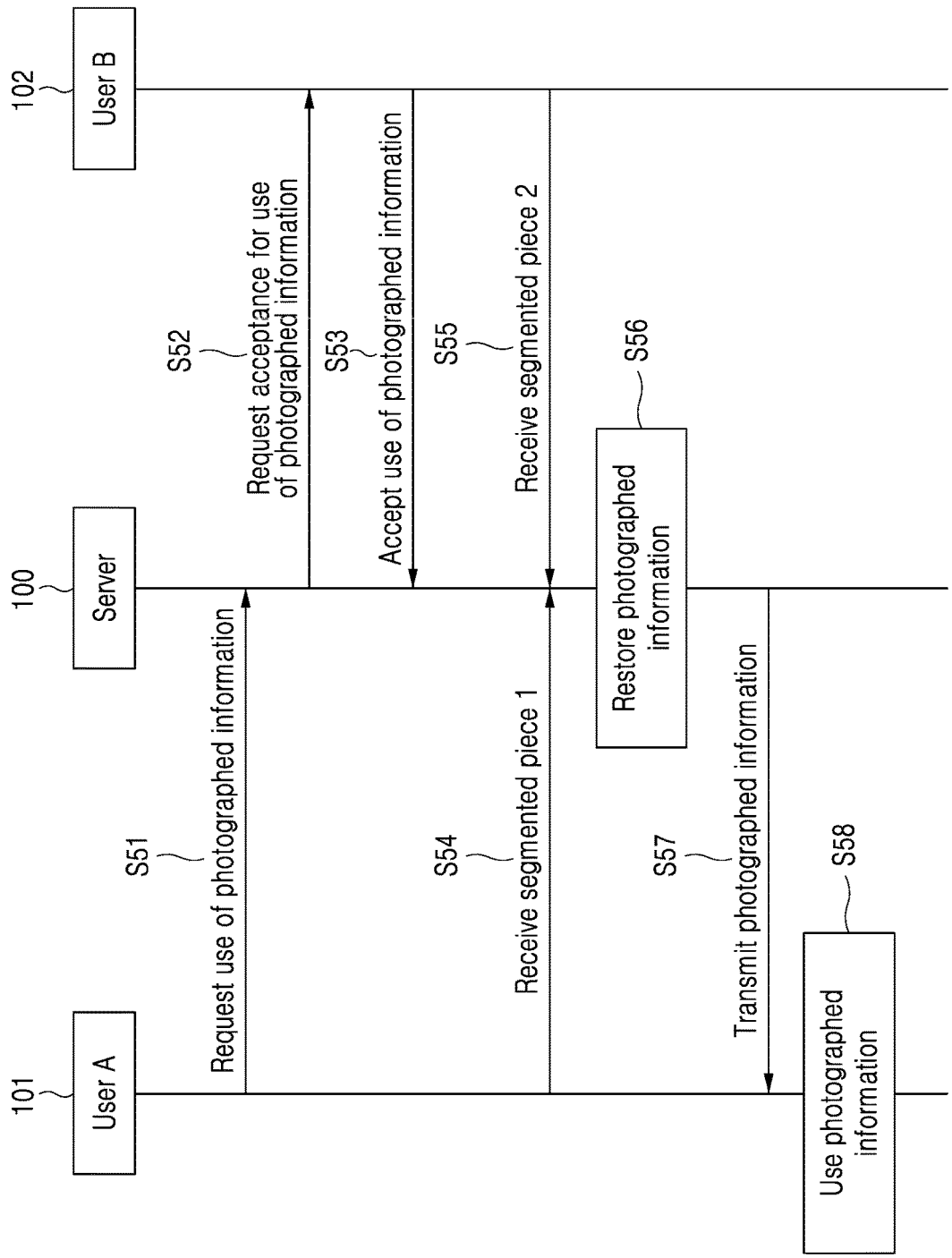
FIG. 5 is a diagram for illustrating an example of a photographed information restoration process according to an embodiment of the present invention.

FIG. 5 is a diagram for illustrating an example of a photographed information restoration process according to an embodiment of the present invention.

Referring to FIG. 5, if the user A 101 attempts to check photographed information shared between the user A 101 and the user B 102 (e.g., if the user A 101 executes a view photo), the terminal of the user A 101 may request the use of the photographed information from the server 100 (S51).

When the use request for the photographed information is received from the terminal of the user A 101, the server 100 may request acceptance for the use of the photographed information from a counterpart who shares the photographed information, that is, the terminal of the user B 102 (S52).

When the user B 102 accepts the use of the user A 101 for the photographed information, the terminal of the user B 102 may deliver the acceptance intention of the user B 102 to the server 100 (S53).

When the user B 102 who shares the photographed information with the user A 101 accepts the use of the photographed information, the server 100 receives the segmented piece 1 of the segmented pieces of the photographed information from the terminal of the user A 101 (S54), and receives the segmented piece 2 of the segmented pieces of the photographed information from the terminal of the user B 102 (S55).

Furthermore, when both the segmented piece 1 and the segmented piece 2 forming the photographed information are received from the user A 101 and the terminal of the user B 102, the server 100 may restore the original photographed information using the segmented piece 1 and the segmented piece 2 (S56).

The server 100 may transmit the restored photographed information to the terminal of the user A 101 who has requested the use of the photographed information (S57). Accordingly, the user A 101 may use the photographed information shared with the user B 102 through the terminal of the user A 101 due to the acceptance of the user B 102 (S58).

If the user B 102 does not accept the use of the photographed information, the server 100 may transmit notification, indicating that the use of the photographed information is impossible because the segmented piece 2 of the photographed information cannot be obtained and thus restoration to the original information is impossible, to the terminal of the user A 101.

Accordingly, in accordance with the embodiment of the present invention, the user A 101 and the user B 102 can retain and share photographed information segmented in a piece unit, can check the photographed information only when they accept the use of the photographed information, and cannot check or open the photographed information if a counterpart does not accept the use of the photographed information.

Figure 6:
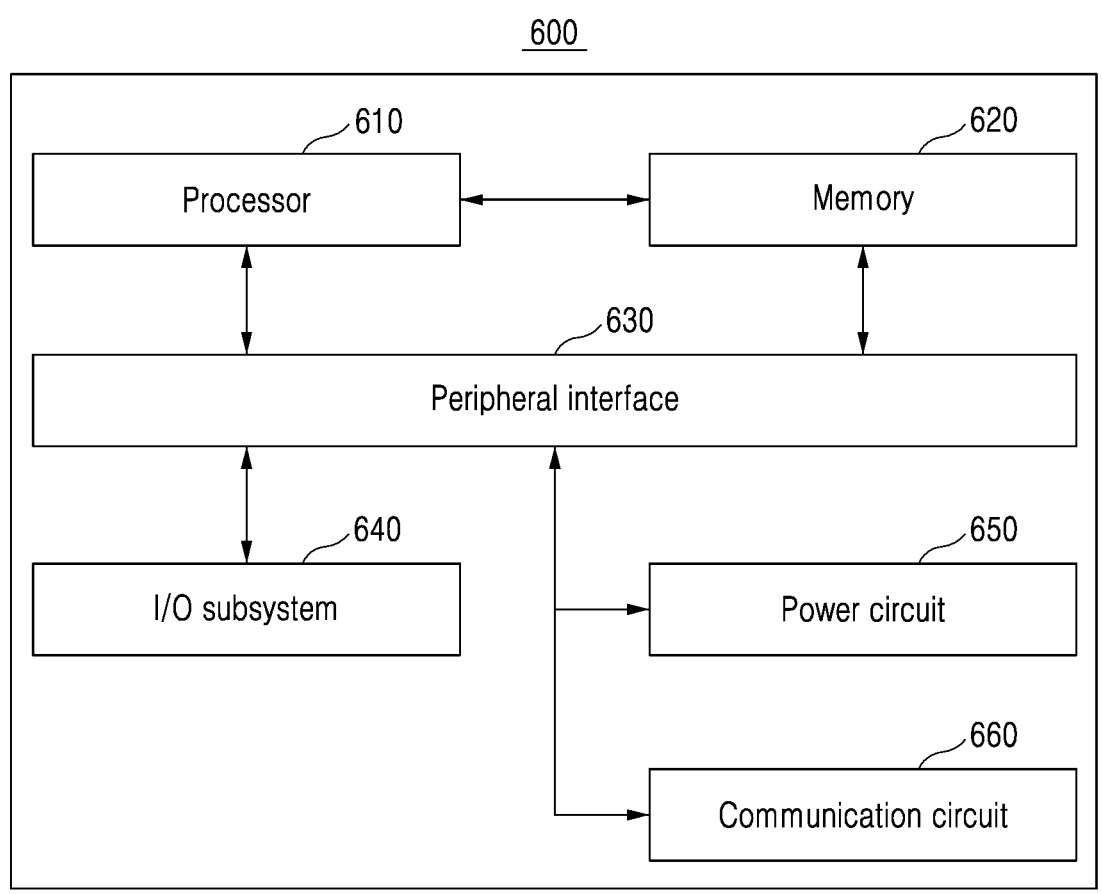
FIG. 6 is a block diagram for illustrating an example of the internal configuration of a computer system according to an embodiment of the present invention.

FIG. 6 is a block diagram for illustrating an example of the internal configuration of a computer system according to an embodiment of the present invention.

As shown in FIG. 6, the computer system 600 may include at least one processor 610, memory 620, a peripheral interface 630, an I/O subsystem 640, a power circuit 650 and a communication circuit 660 at least. The computer system 600 may correspond to the user terminal 101, 102 described with reference to FIG. 1.

The memory 620 may include high-speed random access memory, magnetic disks, SRAM, DRAM, ROM, flash memory or non-volatile memory, for example. The memory 620 may store a software module, an instruction set or other various data necessary for the operation of the computer system 600. In this case, the access of the processor 610 or other component, such as the peripheral interface 630, to the memory 620 may be controlled by the processor 610.

The peripheral interface 630 may couple the input and/or output peripheral device of the computer system 600 with the processor 610 and the memory 620. The processor 610 may perform various functions for the computer system 600 and process data by executing the software module or instruction set stored in the memory 620.

The I/O subsystem 640 may couple various I/O peripheral devices with the peripheral interface 630. For example, the I/O subsystem 640 may include a controller for coupling a monitor, a keyboard, a mouse, a printer or peripheral devices, such as a touch screen or sensor, if necessary, with the peripheral interface 630. In another aspect, the I/O peripheral devices may be connected to the peripheral interface 630 without the intervention of the I/O subsystem 640.

The power circuit 650 may supply power to some of or all the elements of the user terminal. For example, the power circuit 650 may include a power management system, a battery or one or more power sources such as AC, a charging system, a power failure detection circuit, a power converter or inverter, a power state indicator, or any other components for power generation, management and distribution.

The communication circuit 660 may communicate with another computer system using at least one external port. Alternatively, as described above, the communication circuit 660 may include an RF circuit, if necessary, and communicate with another computer system by transmitting/receiving an RF signal called an electromagnetic signal.

In the embodiment of FIG. 6, the computer system 600 is only an example. The computer system 600 may omit some of the elements shown in FIG. 6, may further include an additional component not shown in FIG. 6 or may have a configuration or disposition in which two or more elements are combined. For example, the computer system for a communication terminal of a mobile environment may further include a touch screen or a sensor in addition to the elements of FIG. 6. The communication circuit 660 may include circuits for RF communication, such as various communication methods (e.g., Wi-Fi, 3G, LTE, Bluetooth, NFC and Zigbee). Elements which may be included in the computer system 600 may be implemented as hardware including an integrated circuit specific to one or more signal processing or apps, software or a combination of the hardware and software.

As described above, in accordance with the embodiments of the present invention, the leakage of unwanted information can be prevented by not allowing information including contents to be protected to be shared without permission from a counterpart that shares the information including contents to be protected.

For example, in the case of intimate friends, distrust for a counterpart or his or her own anxiety can be reduced because any one of the friends can be prevented from checking a photo or moving image photographed together or providing it to others without permission from a counterpart. For another example, if the important document of a company or organization is shared, reliability between two parties can be improved because the contents of the document cannot be restored and revealed without consent from a counterpart who shares the document.

The methods according to the embodiments of the present invention may be implemented in the form of program instructions executable through various computer systems and recorded on a computer-readable medium.

A program according to the present embodiment may be a mobile-dedicated app or a PC-based program. An app to which the present invention is applied may be implemented in the form of an independently operating program or an in-app form of a specific app, and may be implemented to operate on a specific app.

Furthermore, the methods according to the embodiments of the present invention may be performed in such a manner that an app associated with a server system providing information protection service controls a user terminal. For example, the app may execute one or more processes configured to perform one or more of the characteristics described in this specification. Furthermore, the app may be installed on a user terminal through a file provided by a file distribution system. For example, the file distribution system may include a file transmitter (not shown) that transmits the file in response to a request from the user terminal.

The apparatus described above may be implemented in the form of a combination of hardware elements, software elements, and/or hardware elements and software elements. For example, the apparatus and elements described in the embodiments may be implemented using one or more general-purpose computers or special-purpose computers, for example, a processor, a controller, an arithmetic logic unit (ALU), a digital signal processor, a microcomputer, a field programmable array (FPA), a programmable logic unit (PLU), a microprocessor or any other device capable of executing or responding to an instruction. The processing device may perform an operating system (OS) and one or more software applications executed on the OS. Furthermore, the processing device may access, store, manipulate, process and generate data in response to the execution of software. For convenience of understanding, one processing device has been illustrated as being used, but a person having ordinary skill in the art may be aware that the processing device may include a plurality of processing elements and/or a plurality of types of processing elements. For example, the processing device may include a plurality of processors or a single processor and a single controller. Furthermore, other processing configurations, such as a parallel processor, are also possible.

Software may include a computer program, code, an instruction or one or more combinations of them and may configure the processing device so that it operates as desired or may instruct the processing device independently or collectively. Th software and/or data may be interpreted by the processing device or may be embodied in a machine, component, physical device, virtual equipment or computer storage medium or device of any type or a transmitted signal wave permanently or temporarily in order to provide an instruction or data to the processing device. The software may be distributed to computer systems connected over a network and may be stored or executed in a distributed manner. The software and data may be stored in one or more computer-readable recording media.

The method according to the embodiment may be implemented in the form of a program instruction executable by various computer means and stored in a computer-readable recording medium. The computer-readable recording medium may include a program instruction, a data file, and a data structure solely or in combination. The program instruction recorded on the recording medium may have been specially designed and configured for the embodiment or may be known to those skilled in computer software. The computer-readable recording medium includes a hardware device specially configured to store and execute the program instruction, for example, magnetic media such as a hard disk, a floppy disk, and a magnetic tape, optical media such as CD-ROM or a DVD, magneto-optical media such as a floptical disk, ROM, RAM, or flash memory. Examples of the program instruction may include both machine-language code, such as code written by a compiler, and high-level language code executable by a computer using an interpreter. The hardware device may be configured in the form of one or more software modules for executing the operation of the embodiment, and the vice versa.

In accordance with embodiments of the present invention, the leakage of unwanted information can be prevented because information including contents to be protected cannot be used without permission from a counterpart who shares the information including contents to be protected.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims belong to the scope of the claims.

What is claimed is:

1. An information protection method implemented by a computer system, comprising:
    setting shared photograph information to be protected and a sharing counterpart including a plurality of users with whom the shared photograph information is to be shared;
    receiving, by a server computer, the shared photograph information from a first terminal;
    automatically deleting the shared photograph information from the first terminal after the shared photograph information is received by the server computer;
    segmenting the shared photograph information into a plurality of pieces and storing the segmented pieces in terminals of the users included in the sharing counterpart including the first terminal; and
    receiving the segmented pieces from the terminals of the users and restoring the shared photograph information if all of the users included in the sharing counterpart accept use of the shared photograph information.

2. The information protection method of claim 1, wherein storing the segmented pieces comprises segmenting the shared photograph information into pieces of a number corresponding to a number of persons of the sharing counterpart.

3. The information protection method of claim 1, wherein storing the segmented pieces comprises:
    ciphering the segmented pieces, and
    transmitting the ciphered segmented pieces to the terminals of the users.

4. The information protection method of claim 3, wherein storing the segmented pieces comprises transmitting an encryption key used for the ciphering of the segmented pieces to the terminals of the users along with the segmented pieces.

5. The information protection method of claim 3, wherein an encryption key used for the ciphering of the segmented pieces is stored in a repository different from a repository of the segmented pieces.

6. The information protection method of claim 1, wherein storing the segmented pieces comprises:
    ciphering the segmented pieces using different encryption keys, and
    transmitting the ciphered segmented pieces to the terminals of the users.

7. The information protection method of claim 1, wherein restoring the shared photograph information comprises:
    requesting use acceptance for the shared photograph information from a terminal of at least a first user included in the sharing counterpart when a use request for the shared photograph information is received from a terminal of a second user included in the sharing counterpart;
    receiving all of the segmented pieces forming the shared photograph information from the terminals of the users included in the sharing counterpart when all the users included in the sharing counterpart accept the use of the shared photograph information and restoring the shared photograph information; and
    transmitting the restored shared photograph information to the terminal of the second user who has requested the use of the shared photograph information.

8. The information protection method of claim 7, wherein the segmented pieces are ciphered, and wherein restoring the shared photograph information comprises:

receiving an encryption key from the terminal of each of the users included in the sharing counterpart along with the segmented piece, deciphering the segmented piece, and restoring the shared photograph information.

9. The information protection method of claim 7, wherein restoring the shared photograph information comprises processing the restored shared photograph information using a copy prevention scheme.

10. An information protection system implemented as a computer system programmed to perform steps comprising:

set shared photograph information to be protected and a sharing counterpart including a plurality of users with whom the shared photograph information is to be shared;

receive, by a server computer, the shared photograph information from a first terminal;

automatically delete the shared photograph information from the first terminal after the shared photograph information is received by the server computer;

segment the shared photograph information into a plurality of pieces;

store the segmented pieces in terminals of the users included in the sharing counterpart;

receive the segmented pieces from the terminals of the users; and restore the shared photograph information if all of the users included in the sharing counterpart accept use of the shared photograph information.

* * * * *